US009862489B1

(12) United States Patent
Weinstein et al.

(10) Patent No.: US 9,862,489 B1
(45) Date of Patent: Jan. 9, 2018

(54) METHOD AND APPARATUS FOR DRONE DETECTION AND DISABLEMENT

(71) Applicants: Lee Weinstein, Arlington, MA (US); Jay Gainsboro, Framingham, MA (US)

(72) Inventors: Lee Weinstein, Arlington, MA (US); Jay Gainsboro, Framingham, MA (US)

( * ) Notice: Subject to any disclaimer, the term of this patent is extended or adjusted under 35 U.S.C. 154(b) by 0 days.

(21) Appl. No.: 15/017,651

(22) Filed: Feb. 7, 2016

(51) Int. Cl.
B64C 39/02 (2006.01)
B64F 1/02 (2006.01)
G01S 13/06 (2006.01)
G01S 15/06 (2006.01)
G01S 17/06 (2006.01)
B64D 1/18 (2006.01)

(52) U.S. Cl.
CPC .............. B64C 39/024 (2013.01); B64D 1/18 (2013.01); B64F 1/02 (2013.01); G01S 13/06 (2013.01); G01S 15/06 (2013.01); G01S 17/06 (2013.01); B64C 2201/126 (2013.01); B64C 2201/14 (2013.01); B64C 2201/182 (2013.01)

(58) Field of Classification Search
CPC ............ B64C 39/024; B64C 2201/126; B64C 2201/12; B64C 2201/182; B64D 1/18; B64F 1/02
See application file for complete search history.

(56) References Cited

U.S. PATENT DOCUMENTS

| 9,656,765 | B2* | 5/2017 | von Flotow | B64F 1/02 |
| 2006/0082488 | A1 | 4/2006 | Keller | |
| 2009/0135046 | A1 | 5/2009 | Steele | |
| 2009/0288573 | A1 | 11/2009 | Rotkopf | |
| 2011/0120335 | A1 | 5/2011 | Fullerton | |
| 2016/0082460 | A1* | 3/2016 | McMaster | B05B 9/007 701/2 |

OTHER PUBLICATIONS

Mini-RPV Recovery System Conceptual Study, Prepared for Eustis Directorate U.S. Army Air Mobility Research and Development Laboratory, Aug. 1977 (322 pages).*

* cited by examiner

Primary Examiner — Brian M O'Hara

(57) ABSTRACT

A preferred embodiment of a method and apparatus for detection and disablement of an unidentified aerial vehicle (UAV) includes arrays of antenna elements receiving in two modalities (for instance radio frequency (RF) and acoustic modalities, or RF and optical modalities). Signal processing of outputs from multiple antenna arrays locates a potential UAV at specific coordinates within a volume of space under surveillance, and automatically aims video surveillance and a short-range projectile launcher at the UAV, and may automatically fire the projectile launcher to down the UAV.

6 Claims, 2 Drawing Sheets

METHOD AND APPARATUS FOR DRONE DETECTION AND DISABLEMENT

FIELD OF THE INVENTION

The field of the invention relates to unmanned aerial vehicles (also known as drones or UAVs) and more specifically to the detection of and disablement of drones in the vicinity of a facility or property, to protect against security breach, terrorism, spying on property, or importation of contraband or other dangerous or illegal substances, etc.

BACKGROUND OF THE INVENTION

Remote-controlled unmanned aerial vehicles have become inexpensive and now represent a potential security threat to both government, corporate, and private facilities. For example, a large variety of remote-controlled quadracopters (aerial vehicles with four sets of rotor wings, which are inherently stable and easy to fly) have become available on the hobby market in recent years. Quadracopters available for the hobby market range from inexpensive unit such as the UDI U818A quadracopter with on-board remote-viewable low-definition video, to units in the $3000 price range such as the XP2 Quadracopter by XProHeli, which includes a gimbaled video camera which transmits live high-definition video images back to the remote control unit. Many units are made to be controlled via standard IEEE 802.11b wireless Ethernet, so they can be controlled by using a smartphone as the remote control and video viewing unit. Recently, self-navigating quadracopters have become available which can be programmed to fly a course defined by a series of waypoints defined by GPS coordinates.

While remote-controlled aerial vehicles are fun toys for hobbyists, they may also be used by criminals, for instance to spy through windows, to spy inside a fenced secure perimeter, or to smuggle contraband such as a cell phone or a weapon or an explosive over the security wall and/or fence of a secure facility such as a prison. There is a need for innovative technologies which can detect UAVs near or within a secure perimeter. There is a further need for innovative technologies which can detect remote-control devices used to control a UAV within or near a secure perimeter. There is a further need for innovative technologies which can disable a UAV detected within or near a secure perimeter. With regard to the problem of airborne smuggling of contraband into prisons and the like, there is a further need for innovative technologies which will facilitate automated detection of contraband that may be lobbed over a prison wall, or dropped from a UAV or private plane at significant altitude.

Techniques are known in the art for detecting electronic devices through radiated or re-radiated energy. Such techniques are described in US patent application #20090135046 (hereinafter Steele) and US patent application #20060082488 (hereinafter Keller) however, the ability to locate a target accurately in space using a directional receiver typically requires a large directional antenna (such as a parabolic RADAR dish, or a large phased array of antennas). Such techniques are not suitable for use in an urban area unless they can be highly targeted, and are only targeted at real threats. There is a need for innovative location technologies that will allow equipment that can be unobtrusively installed at a small facility (such as a private home) to accurately locate potential UAV threats. There is a need for more accurate location technologies, suitable for verifying real electronic device threats in a crowded urban environment.

Techniques are known in the art for directing energy toward a potential threat such as a UAV. Keller discloses a method of disabling electronic components with a high-powered burst of electromagnetic radiation. US patent application #20110120335 (hereinafter Fullerton) discloses a method of disabling a target by focusing very loud sound waves (formed through a timed array of detonations). US patent application #20090288573 (hereinafter Rotkopf) discloses a method for disabling an aerial target such as a low-velocity rocket, using explosively formed blade projectiles fired from an intercepting rocket. While each of these techniques have applications in urban warfare, these techniques have the potential to cause collateral damage in a peace-time suburban or urban setting. There is a need for innovative technologies to disable slow-moving UAVs such as those sold on today's hobby market, without the potential for causing collateral damage to persons or structures in a suburban or urban environment.

When locating sources of electromagnetic radio frequency (RF) radiation (whether such radiation is primary emitted radiation such as might be emitted from a video-camera-equipped UAV) or primary reflected RF energy such as would be detected by conventional RADAR, or harmonic or cross-product RF emissions created by nonlinear circuit elements when illuminated by a probe signal such as a RADAR signal, it is imperative to be able to locate the source of such RF accurately enough to do something useful (such as disable a UAV emitting such RF radiation).

In a RADAR system, a highly directed beam of energy is emitted either from a shaped single antenna (such as a parabolic dish) which is pointed in a given direction, or from a phased array of antennas, whose transmitted energy sums in a given direction. The time between when transmitted energy goes out and when reflected energy returns gives the distance to the reflecting object, and the angle of the antenna gives the direction. Thus the precision to which an object can be located in space by a RADAR system depends on the precision of the time from RF broadcast to RF reception, and on the angular directivity of the antenna. Angular directivity may be thought of as related to antenna gain, which is the ratio of the highest sensitivity direction of reception of an antenna to the average sensitivity of reception (averaged over all possible directions) of that antenna. Antenna gain scales with the size of an antenna array (or with the size of a shaped antenna such as a dish) compared to the wavelength of the RF frequency being received/transmitted.

A shaped antenna is often far less expensive than an antenna array of equivalent antenna gain, but if a shaped antenna is to be used to locate objects throughout a volume of space, it must be continually moved in a repetitive pattern (for instance rotated in a circle), and the mechanism to do the repetitive movement may itself be expensive and unreliable compared to the electronics needed to drive an array of fixed-position antennas. There is a need for innovative technologies that allow accurate location of UAVs near a facility with minimal cost for the electronics and hardware involved.

Methods known in the art for disabling or destroying aerial targets in warfare (both battlefield warfare and urban warfare) usually use explosively propelled projectiles (such as disclosed by Rotkopf), or bursts of high-powered electromagnetic energy (such as disclosed by Keller), or extremely loud sounds produced by timed detonations (such as disclosed by Fullerton), however, these methods all have the potential to cause undesirable damage should they be used in peacetime in an urban or suburban environment. There is a need for innovative technologies capable of disabling a UAV without causing collateral damage in an urban or suburban environment. Furthermore, there is a need for innovative technologies for detecting and destroying or disabling UAVs at short range.

SUMMARY OF THE INVENTION

It is an object of the present invention to provide innovative technologies which can inexpensively detect and accurately locate UAVs near or within a secure perimeter. It is a further object of the present invention to provide innovative technologies which can inexpensively detect and accurately locate remote-control devices used to control a UAV within or near a secure perimeter. It is a further object of the present invention to provide methods and apparatus which can disable a UAV detected within or near a secure perimeter without causing collateral damage. It is a further object of the present invention to provide innovative threat location and tracking apparatus which is inexpensive and can be unobtrusively installed at a small facility (such as a private home) and can accurately locate potential UAV threats.

It is a further object of the present invention to facilitate the automated detection of and interception of contraband or dangerous materials that may be dropped into a restricted facility or area from significant altitude, or lobbed over the perimeter of such restricted area.

In one aspect, the present invention uses inexpensive acoustic detection and localization technology to detect, locate, and track potential UAV threats. The acoustic detection aspect of the present invention takes advantage of the fact that the rotor wings or propellers of quadracopters and other UAVs available on today's hobby market continuously generate sound with a well characterized frequency spectrum while propelling the UAV and/or keeping it airborne. In a preferred embodiment, reliability of detection is enhanced by ensuring that a detected sound source has more than one of the following three characteristics before identifying it as a potential threat:

The sound source has specified spectral characteristics
The sound source is moving
The sound is coming from a direction that should be silent
In a preferred embodiment, this aspect of the invention utilizes three stages of localization:
1. Initial detection comprising automated omnidirectional listening with spectral filtering, combined with automated repetitive directional listening sweep using sparse array (for instance 4×4) of microphones.
2. Triangulation to measure distance and verify movement.
3. Precise detection of angle of source with respect to microphone array, by precise steering of deep cancellation nulls between pairs of microphones.

In a second aspect, the present invention uses RF detection and localization technology to detect, locate, and track potential UAV threats, and remote control devices used to control such UAVs. This aspect of the invention takes advantage of the fact that UAVs available on the hobby market are typically broadcasting data back to the remote control unit periodically or continuously while in flight. In a preferred embodiment, reliability of detection is enhanced by ensuring that a detected RF source has more than one of the following three characteristics before identifying it as a potential threat:

The RF source has specified spectral characteristics typical of hobby UAVs
The RF source is moving
The RF source is located in a direction from which no RF transmissions should be coming.
In a preferred embodiment, this aspect of the invention utilizes three stages of localization:
1. Initial detection comprising automated omnidirectional RF listening with spectral filtering, combined with automated repetitive directional RF listening sweep using sparse array (for instance 4×4) of antennas.
2. Triangulation to measure distance and verify movement.
3. Precise detection of angle of source with respect to antenna array, by precise steering of a deep cancellation null of an antenna array.

Each of steps 3 in the above paragraph and two paragraphs previous takes advantage of the fact that a very simple and inexpensive pair of microphones (for sound) or antennas (for RF reception) will have a very precisely defined plane of signal cancellation, so two orthogonally oriented pairs of microphones (for sound) or antennas (for RF reception) can be used to precisely determine the direction (for instance both elevation and azimuth) of origin of a signal, provided signal-to-noise ratio is sufficient. Rather than physically sweep the orientation of each pair of microphones or antennas, an electronically controlled phase or time delay between the two may be used to inexpensively steer the direction of the null cancellation plane.

In a third aspect, the present invention increases certainty of detection still further by combining two detection modalities for verification, for instance acoustic and RF modalities, or acoustic or RF combined with optical reflection.

In a fourth aspect, the present invention utilizes short-range projectiles harmless to persons or structures (such as water jets, weighted nets, and/or retrievable projectiles attached to cord or fishing line or the like, or high-velocity groupings of small projectiles with lower density than standard shotgun shot) to disable UAVs by disabling rotor wings or propellers. In an alternate embodiment, standard destructive projectiles such as shotgun shot may be used.

In a sixth aspect, the present invention uses a modulated light source along with at least one synchronously demodulated video camera to detect airborne objects within a volume of space illuminated by the light source and within the field of view of the camera. In a preferred embodiment, images acquired from two video cameras viewing the same volume of space from different vantage points are processed together to derive three-dimensional coordinates of detected airborne objects.

In a preferred embodiment, airborne objects detected are then automatically illuminated with a continuous directional light source and video of the illuminated object is analyzed for regions where frequency components indicative of the possible rotational modulation frequency range of reflected flicker that would result from rotating propellers. Alternately, reflected light is analyzed for spectral characteristics likely to indicate material composition (such as by distinguishing spectral differences between light reflected from bird feathers vs. light reflected from plastic).

Thus, in a preferred embodiment, either temporal optical characteristics of an object (such as a frequency of modulation of light reflected from a portion of an airborne object, or a cyclic change in shape of an airborne object), or spectral optical characteristics (such as a wavelength of light reflected or absorbed by an airborne object), or both are used to distinguish between a UAV and common airborne objects such as birds and leaves. Additionally, in a preferred embodiment, when an airborne object is spotted, zoomed-in images are automatically acquired for subsequent automated or manual shape recognition.

In a preferred embodiment, when a detected airborne object is determined to have a high probability of being a UAV, data about the detected object (for instance an image of the object and/or a map indicating the position and flight path of the object) is automatically sent to one or more cell phones (for instance cell phones of security personnel and/or a property owner. In a preferred embodiment, a control interface is provided, allowing the cell phone user to select a course of action (such as capturing the UAV, destroying the UAV, disabling the UAV, blinding the UAV, etc.).

In a seventh aspect, in a preferred embodiment, when a UAV is detected, one or more defense UAVs may be launched to either disable, partially disable, or capture a detected UAV. In an embodiment optimized to prevent terrorists from flying explosives into a sports stadium, multiple coordinated defense UAVs are launched to intercept the detected UAV with a net, and drag it to a desired location.

In an alternate embodiment optimized to prevent video spying on the grounds of or through the windows of a private residence or other facility, a single defense UAV is launched, equipped with a paint-spraying apparatus 1014, to intercept the detected UAV and blind any cameras 1015 the detected UAV may be equipped with.

In an alternate embodiment optimized around disabling a detected UAV, a defense UAV is launched which has an array of flexible cords (such as strings) detachably suspended below the defense UAV. In such an embodiment the defense UAV is guided to fly over the detected UAV at a differential altitude such that the hanging strings entangle the propellers of the detected UAV and then automatically detach from the defense UAV.

In another embodiment optimized around disabling a detected UAV, a defense UAV is launched which is capable of spraying expanding polyurethane foam on the detected UAV. Any particles of the sprayed polyurethane foam that stick to critical aerodynamic surfaces such as propellers, wings, or rotors, continue expanding after sticking, thus destroying the lift or propulsion efficacy of the UAV.

In an eighth aspect, the present invention may be configured to send an alert to one or more mobile phones upon detection of a UAV. In a preferred embodiment, location information about the detected UAV is also sent so that the position of the detected UAV may be displayed on a graphical display. Even in embodiments where no means of disabling a detected UAV has been installed, users of the present invention may want to know when and from what vantage point their person or their property may be under aerial surveillance by a UAV.

In a ninth aspect, the present invention utilizes optical trajectory tracking of airborne objects to detect objects dropping into a protected area along a trajectory which is vertical within a predetermined tolerance (to detect objects dropped from altitude), or parabolic within a predetermined tolerance (to detect objects lobbed over a perimeter). In a preferred embodiment, the calculated likely landing point of such objects are communicated automatically to security officials, along with automatically captured images of such objects. In a preferred embodiment, one or more automated UAVs may be launched to intercept and capture such objects.

DETAILED DESCRIPTIONS OF SOME PREFERRED EMBODIMENTS

Figure 1:
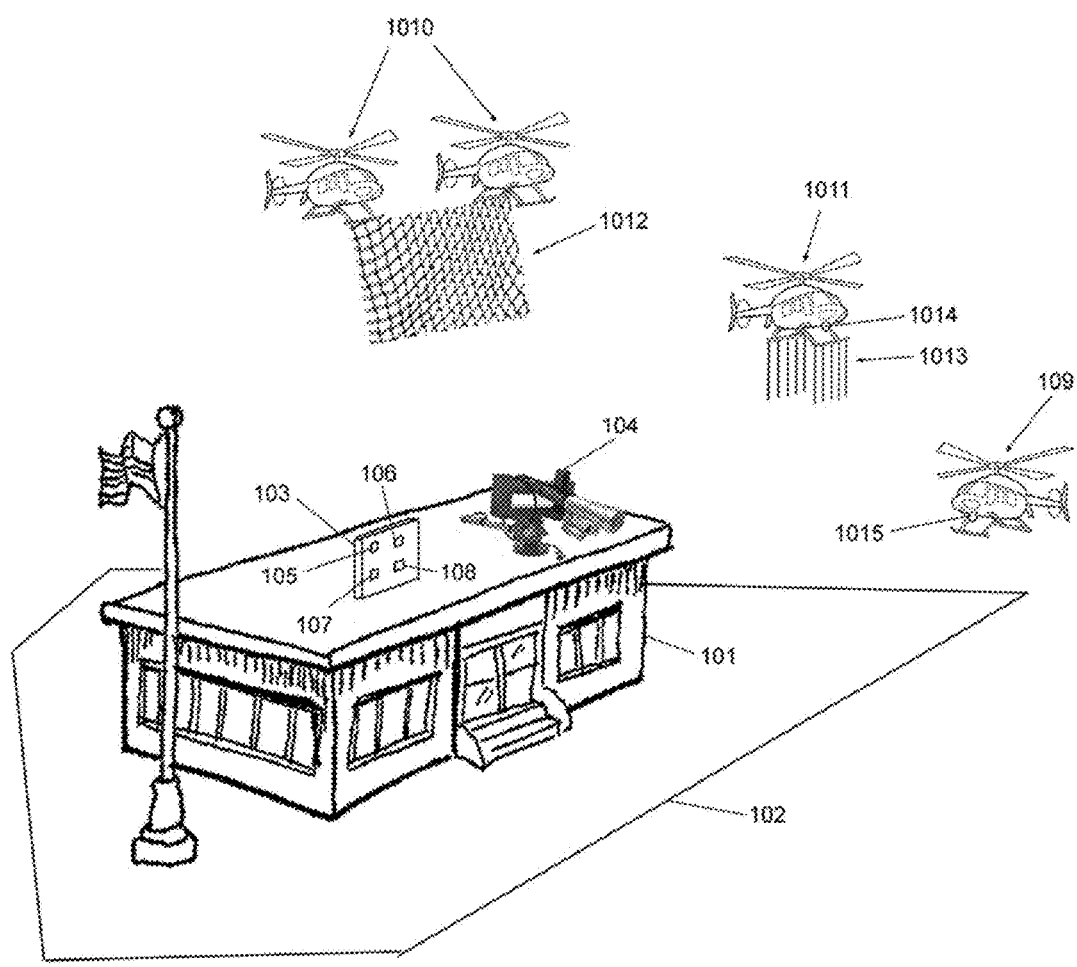
FIG. 1 depicts a building within a perimeter, equipped with an antenna array (for UAV detection), a servo-aimed assembly including a video camera, a directional light source, and a water canon according to aspects of the present invention.

FIG. 1 depicts a building 101 within a perimeter 102. Building 101 is equipped with a UAV detection antenna array 103, and servo-aimed assembly 104. In a preferred embodiment, servo-aimed assembly 104 includes a camera, a directional light source, and a water canon according to aspects of the present invention. In a preferred embodiment, antenna array 103 includes at least three spatially disparate antenna elements.

Within this document, the word antenna may be used to refer in some instances to an element which receives Radio frequency (RF) electromagnetic energy and converts such energy to an electrical signal. The word antenna may alternately be used to refer to an element such as a microphone, which receives acoustic energy and converts it to an electrical signal. The word antenna may alternately be used to refer to an element such as a pixel in a video camera image sensor, which receives optical energy and converts it into an electrical signal. Within this document a microphone may thus be referred to as an acoustic antenna or an acoustic antenna element, an electromagnetic antenna may be referred to as an RF antenna or an RF antenna element, and a pixel of an image sensor may be referred to as an optical antenna element.

The present invention utilizes like principals for detection and localization using acoustic and RF signals. Within this document, the term "receiver element" may refer to either an acoustic signal receiver element such as a microphone, a radio frequency signal receiver element such as a dipole antenna, or a pixel of an electronic image sensor.

Figure 2:
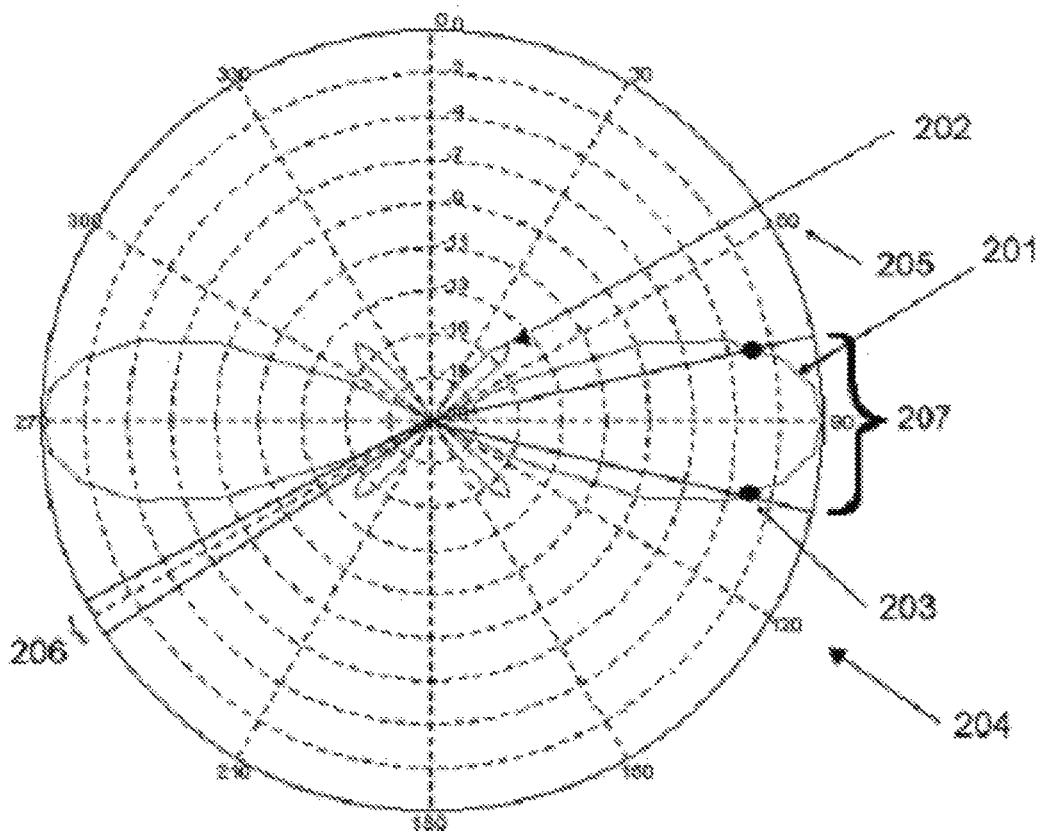
FIG. 2 is a polar gain pattern of an example antenna array that might be used in the present invention.

FIG. 2 is a polar gain pattern of an example antenna array that might be used in the present invention to determine the direction from which a signal given off by a UAV is being received. To locate a point in space in polar coordinates, one needs two angular coordinates and one radial coordinate. The polar gain pattern of FIG. 2 enables the determination of one angular coordinate such as shown on angular coordinate scale 205. Those skilled in the art will readily see that the addition of an orthogonal polar gain pattern from an orthogonal antenna array provides two angular coordinates. Thus a two-dimensional antenna array enables angular location of a signal source, and multiple two-dimensional arrays enable three-dimensional location of a signal source.

We will now examine the angular specificity to which an antenna gain pattern such as the one shown in FIG. 2 can locate a signal source. Suppose for example that we define angular specificity as twice the angular change needed to produce a 3 dB change in signal level. Looking at the main lobes 201 of the antenna array gain pattern in FIG. 2, we see that the angular specificity 207 of main lobe 201 is about 30 degrees (the angular difference between half-power points 203). In situations where signal-to-noise ratio is not good, this is the best angular specificity we will get from such an antenna array. However, in situations where signal is strong and thus signal-to-noise ratio is good, we can take advantage of the tighter angular specificity of nulls such as null 204

(between one of the minor lobes 202 and one of the major lobes 201), which (at sufficient signal-to-noise ratio) has angular specificity 206 (about four times as good as angular specificity 207).

Returning now to FIG. 1, we see how two-dimensional antenna array 103 is used to determine two angular coordinates of a UAV which is acting as an RF and/or acoustic source (depending on whether an RF and/or acoustic antenna array is employed). In a preferred embodiment where antenna array 103 comprises co-located acoustic and RF antenna arrays (such that each of antenna elements 105, 106, 107, and 108 comprise both an acoustic antenna element and an RF antenna element), if processing of the signals from both acoustic and RF antenna arrays indicates a signal source with UAV-like spectral characteristics at the same angular coordinates, a high degree of certainty is provided that the signal source is a UAV that needs to be dealt with. In a preferred embodiment, servo-aimed assembly 104 is co-located with antenna array 103 (though they are shown in separate locations in FIG. 1 for clarity), so that the azimuth and elevation angles needed to aim servo-aimed assembly 104 are the same angles derived by processing signals from antenna array 103.

In a preferred embodiment with limited signal processing power, antenna array 103 is physically fixed, and the polar gain pattern of antenna array 103 is repeatedly swept through a sweep range of azimuth angles by time-shifting (or equivalently phase-shifting) the outputs of antenna elements relative to one another. In a manner similar to the phased array beam sweeping used to direct signals from phased cell phone tower antenna arrays.

In a preferred embodiment with limited signal processing power, a suspected UAV signal source is first detected during a horizontal sweep of the highest gain lobe of the beam pattern of antenna array 103, with the vertical dimension of the antenna array's beam pattern adjusted to an omnidirectional pattern. Once a suspected UAV signal source is detected at a particular azimuth angle in the horizontal plane by sweeping the main horizontal lobe of the antenna pattern, a vertical lobe is formed and swept to measure the vertical (elevation) angle of the signal source. If signal-to-noise ratio is high, further operations of sweeping horizontal and vertical nulls of the antenna pattern past the signal source may also be used to more precisely determine the angular coordinates of the suspected UAV.

While embodiments with limited signal processing power may require mathematically sweeping a given antenna array through a sequence of effective gain patterns, with more signal processing power, all such gain patterns bay be made available simultaneously, and the steps of the above paragraphs may be collapsed to occur nearly simultaneously. Thus the detection of a signal centered in high-gain lobe of a first computationally derived antenna pattern, and the absence of signal in centered on a null of a second computationally derived antenna pattern may be observed simultaneously. This enables a phased antenna array to simultaneously track multiple signal sources (as do cell phone towers when communicating with a plurality of cell phones simultaneously).

In a preferred embodiment, if both RF and acoustic arrays indicate a suspected UAV, and the azimuth angles of the acoustic and RF sources match within a predetermined tolerance, and the elevation angles of the acoustic and RF sources match within a predetermined tolerance, then servo-aimed assembly 104 is automatically aimed at the suspected UAV.

In a preferred embodiment, once servo-aimed assembly 104 is aimed at a suspected UAV, a directional visible light source on servo-aimed assembly 104 is turned on (to illuminate the suspected UAV), and a video image of the suspected UAV is acquired through a zoom-lens-equipped video camera on servo-aimed assembly 104. In a preferred embodiment, the zoom-lens-equipped video camera is capable of acquiring video at a frame rate sufficient to facilitate analysis of the acquired video to detect repetitive patterns indicative of rotating propellers or rotors on a suspected UAV, in order to further differentiate between a motorized UAV and natural airborne objects such as birds or leaves being blown by wind. In an alternate embodiment, differentiation between UAVs and other objects such as birds and leaves is done by analysis of the color spectrum of light reflected from such objects.

In a preferred embodiment the antenna arrays and servo-aimed assembly may be duplicated at another location on the same facility. Two systems as described above may be used together to locate one suspected UAV simultaneously, giving angular coordinates with respect to each antenna array. These two sets of angular coordinates with respect to two reference points allow the calculation of the third polar coordinate of each (radial distance), thus locating the UAV at a known distance and direction from each antenna array (and thus a known distance and direction from each servo-aimed assembly).

In a preferred embodiment employing primary optical detection, a video camera functions as a two-dimensional optical antenna array used for initial detection of suspected UAVs. In such an embodiment, the x and y coordinates at which a suspected UAV appears in a video image can be mapped to azimuth and elevation angles, and two video cameras placed in different locations, each of which has the same UAV in its field of view, uniquely determine the three-dimensional position of that UAV.

In a primary optical detection embodiment, it is important to be able to differentiate between a motorized UAV and a bird or an air-blown leaf or the like, and it is also important for the video cameras employed to be able to detect airborne objects at night. In an alternate embodiment, an illumination source is used to illuminate a volume of space under optical surveillance. The spectrum of the illumination source may be chosen so that chemical compounds commonly found in the feathers of birds reflect some components of the illumination spectrum far more strongly than other components of the spectrum, in order to facilitate differentiating between birds and motor-driven UAVs. In addition, shape recognition algorithms may be employed to differentiate between birds and motorized UAVs within the video field of view.

In a preferred embodiment, a detected UAV may be either tracked and recorded (for instance on video) without being interfered with, or it may be disabled and/or captured. In a preferred embodiment, means for disabling a detected UAV are selected from among means which will not cause damage to nearby structures, and will be unlikely to cause serious injury or death to any nearby persons. In one embodiment, such means may include automatically aimed and fired projectiles, or projectiles aimed and fired under manual remote control.

One preferred UAV-disabling means is a water canon. Another preferred UAV disabling means is a multi-charge shotgun-type weapon which fires an array of pellets made from a material which is not environmentally harmful and which has limited terminal falling velocity due to material density and pellet size chosen. Preferably pellets are made from a material which cause no significant wear to the interior of the muzzle from which they are fired. Such pellets may for example be made of salt, aluminum, brass, plastic, or plastic-coated metal. Such pellets rapidly decelerate after exiting the gun muzzle, and thus can be designed to have a well controlled destructive range.

In a preferred embodiment for use in situations where it is desirable to down an incoming UAV intact, one embodiment of the present invention employs an apparatus which fires a spinning, edge-weighted net from a fixed position. An alternate embodiment employs one or more defense UAVs 1010 carrying a suspended net 1012. In applications where the detected UAV 109 is estimated to be heavier than defense UAVs 1010, net 1012 is automatically released once it contains or has entangled detected UAV 109. Means for automatically releasing net 1212 may tension-actuated means such as a magnetic coupling or a friction coupling, or may be electronically actuated based (for instance) on an abrupt unintended change in the speed and/or direction of one or more of defense UAVs 1010. Such abrupt change may for instance be detected by accelerometers mounted on one or more of defense UAVs 1010.

In an alternate embodiment optimized for use in protecting persons at a sports stadium or the like from a UAV that might be carrying a harmful payload such as explosives or biological or chemical agents intended to harm spectators, defense UAVs 1010 are guided to intercept and capture detected UAV 109 within net 1012, and drag detected UAV 109 to a location chosen to minimize possible harm to spectators.

In another embodiment, defense UAV 1011 is launched to intercept detected UAV 109. Defense UAV 1013 may be guided to either crash into detected UAV 109, or defense UAV 1011 may carry disablement apparatus (such as dangling cords 1013), designed to entangle and disable the propulsion system of detected UAV 109. In a preferred embodiment, such disablement apparatus is designed to detach from defense UAV 1011 once entangled in the propulsion system of detected UAV 109. In a preferred embodiment, defense UAV 1011 incorporates a guidance system that can automatically pilot it to a location that is broadcast to it by a remote-control system. In an alternate embodiment, defense UAV 1011 is a "fly by wire" UAV whose position is remotely sensed by a control system external to defense UAV 1011, and an external system operates directional controls of defense UAV 1011.

As described above, antennas of the present invention may operate in one of the following modalities:
- Passive acoustic detection modality (for instance an acoustic antenna listening to sounds generated by a suspected UAV)
- Passive radio frequency (RF) detection modality (for instance RF antenna listening for an RF signal broadcast by a suspected UAV)
- Broadband passive optical detection modality (for instance receiving sunlight or other broad-spectrum light reflected off a suspected UAV)
- Selective spectral optical detection modality (for instance differentiating between reflected optical spectra indicative of a motorized UAV vs a bird or a leaf blown by the wind)
- Amplitude modulated optical signal detection modality (for instance differentiating between the background optical signal from the sky, and reflected amplitude-modulated light from an amplitude-modulated illumination source, or looking for components of an image that are moving cyclically, such as the propellers of a UAV).
- Optical shape detection modality (for instance differentiating between the shape of a bird and the shape of a leaf and the shape of a motor-driven UAV)
- Optical shape change detection modality (for instance differentiating between the apparent changing shape of a bird as it flaps its wings, and the more constant shape of a motor-driven UAV).

Within this document, the term "UAV-disabling projectile" may be interpreted to mean either a single projectile, or a collection of pellets whose density may be lower than standard shot gun shot, or a stream of water directed under pressure through a nozzle, or a projectile attached to a cord, or a spinning edge-weighted net.

Within this document, the term "paint" is used to denote any adherent liquid, foam, or gel that may be squirted in a stream or sprayed through an atomizer. Within this document, the verb "spray" is used to denote either the act of atomizing a liquid, foam, or gel substance into projected particles, or squirting such a substance in a directed stream.

Figure 3:
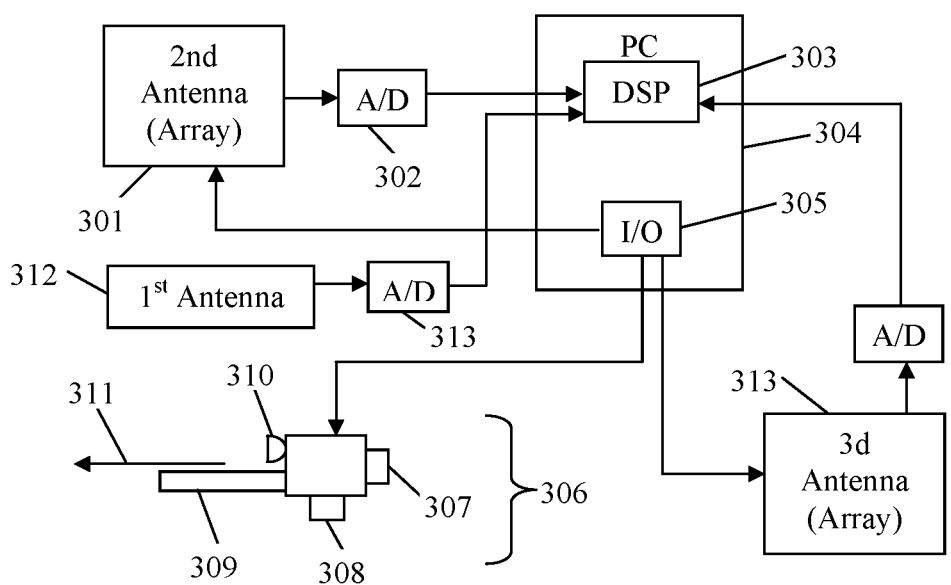
FIG. 3 is a block diagram of UAV detection and disablement apparatus according to a preferred embodiment of the present invention.

FIG. 3 is a block diagram of UAV detection and disablement apparatus according to a preferred embodiment of the present invention. First antenna 312 may be a single-element antenna or an array. Second antenna 301 is an array of antenna elements, the signals from which may be summed with different delays which can be varied under program control by computer instructions read from computer-readable media in computer 304. The delay and summing instructions may be carried out in special-purpose hardware in antenna array 301 or in hardware or software within analog-to-digital (A/D) converter 302, or in digital signal processing (DSP) sub-system 303, or in some combination thereof.

The signal from first antenna 312 is converted to digital form in A/D 313. In a preferred embodiment, beam steering of the antenna gain pattern of antenna array 301 is controlled by signals sent from I/O subsystem 305 in computer 304. Antennas 301 and 302 preferably receive in different signal modalities (for instance acoustic modality and optical modality), and DSP subsystem 303 acts to filter signals from antennas 301 and 302 to detect coincident conditions which indicate the likely presence of signals from a UAV being detected in both modalities, and to derive angular coordinates of a suspected UAV with respect to antenna array 301, so that servo-controllable assembly 306 may be automatically aimed toward the suspected UAV.

In a preferred embodiment, servo-controlled apparatus 306 includes target illumination light source 310 and projectile launching device 309 which point in the same direction and may be aimed under computer control in direction 311 by I/O subsystem 305 sending control signals to servo 307 (which acts to rotate assembly 306 about a first axis), and servo 308 (which acts to rotate assembly 306 about a second axis perpendicular to the first axis).

In a preferred embodiment, signals from antenna array 301 are processed to derive angular coordinates of a suspected UAV with respect to antenna array 301, and signals from antenna array 314 are processed to derive angular coordinates of the same suspected UAV with respect to antenna array 314, and the three-dimensional coordinates of the point in space that satisfies those two independently derived sets of angular coordinates is calculated in computer 304, and used to automatically disable any detected UAV.

In a preferred embodiment where antenna arrays 301 and 314 are both optical antenna arrays (for example video image sensors), illumination source 310 emits a light spectrum that contains spectral lines that are absorbed by bird feathers but not by plastics out of which typical UAVs are made, and antenna arrays 301 and 314 include optical spectral filtering for differentiating between light reflected from a bird and light reflected from a UAV.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable non-transitory mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software. Digital results of any automated process herein may be stored in a non-transitory storage medium such as ROM, RAM, FLASH memory, magnetic disc, etc.; may be printed on paper; may be displayed visually (for instance on a computer monitor, cell phone, or other visible display); may be displayed in audio (for instance synthesized speech); or may be displayed by printing.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a non-transitory machine readable medium such as a storage medium. One or more processors may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

What is claimed is:

1. A UAV disablement system comprising:
   Means for detecting the location of a first airborne UAV;
   a second UAV with one or more flexible cords suspended below said second UAV;
   Means for guiding said second UAV to a position above said first UAV such that at least a first cord of said cords contact said first UAV and becomes entangled in said second UAV;
   Wherein said one or more cords suspended below said second UAV are coupled to said second UAV by a coupling which automatically releases at a predetermined tension.

2. The UAV disablement system of claim 1, wherein said coupling comprises a magnetic coupling.

3. The UAV disablement system of claim 1, wherein said coupling comprises a friction coupling.

4. A UAV disablement system comprising:
   Means for detecting the location of a first airborne UAV;
   A second UAV with one or more flexible cords suspended below said second UAV;
   Means for guiding said second UAV to a position above said first UAV such that at least a first cord of said cords contact said first UAV and becomes entangled in said second UAV;
   Wherein said one or more cords suspended below said second UAV are coupled to said second UAV by an electronically actuated coupling which is actuated based upon a change in speed and/or direction of said second UAV sensed through an accelerometer coupled to said second UAV.

5. A UAV disablement system comprising:
   Means for detecting the presence of a first airborne UAV within a monitored volume of space;
   Means for detecting the location of said first airborne UAV within said monitored volume of space;
   Paint spraying means affixed to said second UAV capable of spraying paint in a known direction from said second UAV in response to an electronic signal; and
   Means for guiding said second UAV to a desired position relative to said first UAV and actuating said paint spraying means to spray paint on said first UAV.

6. The UAV disablement system of claim 5, further comprising means to position said second UAV relative to said first UAV such that said paint spraying means can spray paint on a camera on said second UAV.

* * * * *